United States Patent
Comisky et al.

(10) Patent No.: US 6,654,819 B1
(45) Date of Patent: Nov. 25, 2003

(54) EXTERNAL DIRECT MEMORY ACCESS PROCESSOR INTERFACE TO CENTRALIZED TRANSACTION PROCESSOR

(75) Inventors: David A. Comisky, Plano, TX (US); Iain Robertson, Bedfordshire (GB); Sanjive Agarwala, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 566 days.

(21) Appl. No.: 09/603,332

(22) Filed: Jun. 26, 2000

Related U.S. Application Data
(60) Provisional application No. 60/167,441, filed on Nov. 23, 1999, and provisional application No. 60/144,572, filed on Jul. 15, 1999.

(51) Int. Cl.[7] ............................. G06F 3/00; G06F 13/00
(52) U.S. Cl. ............................... 710/22; 710/23; 710/25
(58) Field of Search ............................. 710/22, 25, 23

(56) References Cited

U.S. PATENT DOCUMENTS

| | | | | |
|---|---|---|---|---|
| 5,634,076 A | * | 5/1997 | Garde et al. ................. | 710/22 |
| 5,669,013 A | * | 9/1997 | Watanabe et al. ............. | 710/5 |
| 5,826,106 A | * | 10/1998 | Pang ........................... | 710/25 |
| 5,944,800 A | * | 8/1999 | Mattheis et al. .............. | 710/23 |
| 6,240,458 B1 | * | 5/2001 | Gilbertson ................... | 709/232 |
| 6,253,260 B1 | * | 6/2001 | Beardsley et al. ............. | 710/5 |
| 6,370,601 B1 | * | 4/2002 | Baxter ......................... | 710/65 |
| 6,473,780 B1 | * | 10/2002 | Barcelo ....................... | 709/103 |

* cited by examiner

Primary Examiner—Jeffrey Gaffin
Assistant Examiner—Tammara Peyton
(74) Attorney, Agent, or Firm—Robert D. Marshall, Jr.; W. James Brady, III; Frederick J. Telecky, Jr.

(57) ABSTRACT

An external direct memory access unit includes an event recognizer recognizing plural event types, a priority encoder selecting for service one recognized external event, a parameter memory storing service request parameters corresponding to each event type and an external direct memory access controller recalling service request parameters from the parameter memory corresponding to recognized events and submitting them to a centralized transaction processor. The service request parameters include a priority for centralized transaction processor independent of the event recognition priority. The service request parameters may be stored in the form of a linked list. The service requests are preferably direct memory accesses which may include writes to the parameter memory for self modification. The centralized transaction processor may signal an event to event recognizer upon completion of a requested data transfer.

16 Claims, 7 Drawing Sheets

EXTERNAL DIRECT MEMORY ACCESS PROCESSOR INTERFACE TO CENTRALIZED TRANSACTION PROCESSOR

This application claims priority under 35 USC §119(e)(1) of Provisional Application No. 60/144,572, filed Jul. 15, 1999 and Provisional Application No. 60/167,441, filed Nov. 23, 1999.

TECHNICAL FIELD OF THE INVENTION

The technical field of this invention is digital device functional blocks, used generally in the area of microprocessor design and more specifically in the area of digital signal processor devices.

BACKGROUND OF THE INVENTION

The transfer controller with hub and ports architecture (TCHP), which is the subject of patent application Ser. No. 09/543,970 filed Apr. 6, 2000, now U.S. Pat. No. 6,496,740, is referenced in this text and referred to as simply a centralized transaction processor (CTP). This centralized transaction processor is a significant basic improvement in data transfer techniques in complex digital systems. Along with many other features, the centralized transaction processor allows for uniform implementation of port interfaces at the periphery of such systems. Features of the centralized transaction processor are enhanced when combined with an advanced direct memory access (DMA) processor such as external direct memory access processor external direct memory access of this invention.

Centralized Transaction Processor

The centralized transaction processor functional blocks and their interconnection to the external direct memory access processor are illustrated in the high level diagram of FIG. 1. The centralized transaction processor implementation and feature set are for the most part independent of the external direct memory access functionality. The centralized transaction processor is comprised of hub 100 and ports 111 through 115. It performs the following tasks:

(1) Receives transfer requests in the form of transfer request packets 103 from transfer requester nodes 116 which communicate with the transfer request bus 117; the external direct memory access processor is one of those transfer requesters;

(2) Places these requests in queue manager RAM 102 within the TCHP hub 100;

(3) Prioritizes them by placing them in one of several priority levels within the TCHP hub channel registers 120;

(4) Generates source (read) and destination (write) commands and data for output from the source pipeline 121 and destination pipeline 122;

(5) Broadcasts these source and destination commands and data to all ports 111–115;

(6) Receives read data, acknowledge/status information from ports through the data router 123;

(7) Generates new source (read) and destination (write) commands and data for output from the source pipeline 121 and destination pipeline 122 to the I/O subsystem 123.

DESCRIPTION OF RELATED ART

The precept behind all direct memory access processors is the same: to perform data movement as a sideband function to normal CPU operation. Depending on the complexity of the DMA, various amounts of central processing unit (CPU) intervention may be required at certain intervals. The goal of any DMA processor is of course for zero CPU intervention, but this is generally not realistic.

While system architectures and requirements vary, the general functions that which a DMA must provide can be categorized into relatively few types. First, a DMA must typically be capable of performing simple linear data movements of one or more data words, where the word size is a function of the CPU or system architecture.

Advanced features of a DMA might include multi-dimensionality, however in general the number of dimensions supported is normally low, about one to three. Indexed addressing is another common feature of an advanced DMA processor, wherein data moves may be performed with a fixed offset between data words. The most advanced DMA processors include support for varying indexes, as might be common for PCI scatter-gather operations.

In addition to support for one or more transfer types, direct memory access has traditionally offered a plurality of channels. A channel generically refers a stored set of parameters, perhaps dynamically updated via the system CPU or DMA itself, which pertain to the movement of one datum source to one datum destination. In general, the number of channels supported linearly maps to the required hardware. This occurs because each channel must monitor and update source, destination, and word counts (and perhaps other parameters) separately for each channel supported.

As one would expect, the number of transfer types supported and the number of channels supported has a large impact on the design complexity with the DMA processor design. Additionally there is the verification cost associated with the design that must be considered.

Centralized Transaction Processor Interface

The external direct memory access processor interfaces with the centralized transaction processor as shown in FIG. 1. The external direct memory access controller submits requests to the centralized transaction processor at one of the transfer request nodes 117 of FIG. 1. The external direct memory access boundary is defined by the heavy dashed line. The centralized transaction processor boundary is defined by the heavy line.

XDMA Nomenclature

The acronym XDMA was initially derived to describe the function of consolidating multiple external requests, where 'X' signifies external to the central processing unit (CPU), and 'DMA' refers to the well known direct memory access function. A special category of requesters, mastering peripherals, is of great importance. In a conventional DMA system the peripheral or requester has no control over the actual transaction which is performed. This is instead controlled via the CPU, which sets up the parameters in the DMA control block typically stored in memory mapped registers. The requester is responsible for making the request to the DMA controller.

A classic example of such an operation is a first-in-first-out (FIFO) buffer acting as a requester. The event for such an interface might be the FIFO almost full/empty flag. When set, the DMA engine responds by reading from, or writing to the FIFO, thus servicing it. Note that the FIFO is not capable of setting up the DMA parameters. The CPU must perform that initialization function, as well as any periodic servicing perhaps even resetting the registers after N number of requests have been processed.

SUMMARY OF THE INVENTION

The external direct memory access processor of the present invention performs a super-set of the functions of a conventional DMA. The external direct memory access of this invention also provides all the features of the most advanced DMA functions including a full complement of transfer types plus support for a large number of channels. In addition, the external direct memory access architecture is both scalable and flexible without adding significant hardware for increasing the number of channels or modes supported.

This invention includes only generic features of the external direct memory access architecture which are applicable to a wide range of possible designs. In all cases, the external direct memory access interfaces with a centralized transaction processor which ultimately controls all data transfer operations on a microprocessor chip.

Functionally, the external direct memory access processor consists of three main parts. The first part is the event capture and prioritization logic which serves to handle input requests and channel management. The event capture and prioritization logic continuously monitors the incoming requests for N-channels of the external direct memory access. Additionally, it is responsible for responding to these requests by submitting transfer requests to the second portion of the processor, the external direct memory access controller.

External requests might include, but are not limited to, external interrupts routed directly to the external direct memory access processor, on-chip peripherals not serviced in real time by the CPU, and more intelligent mastering peripherals or host CPUs. Mastering peripherals are characterized by their ability to actively control transaction processing.

The third portion of the external direct memory access processor is the parameter RAM. The parameter RAM is generically the storage facility for the external direct memory access parameters. Because many complex tasks are supported, a high density RAM is very important to the external direct memory access architecture.

The external direct memory access controller performs a superset of all the functions of a conventional DMA. In addition the architecture of the external direct memory access lends itself to a much more scalable and easily maintainable design. Feature enhancements such as new transfer types, or number of events supported, are far simpler to add to the external direct memory access architecture than to a conventional DMA.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
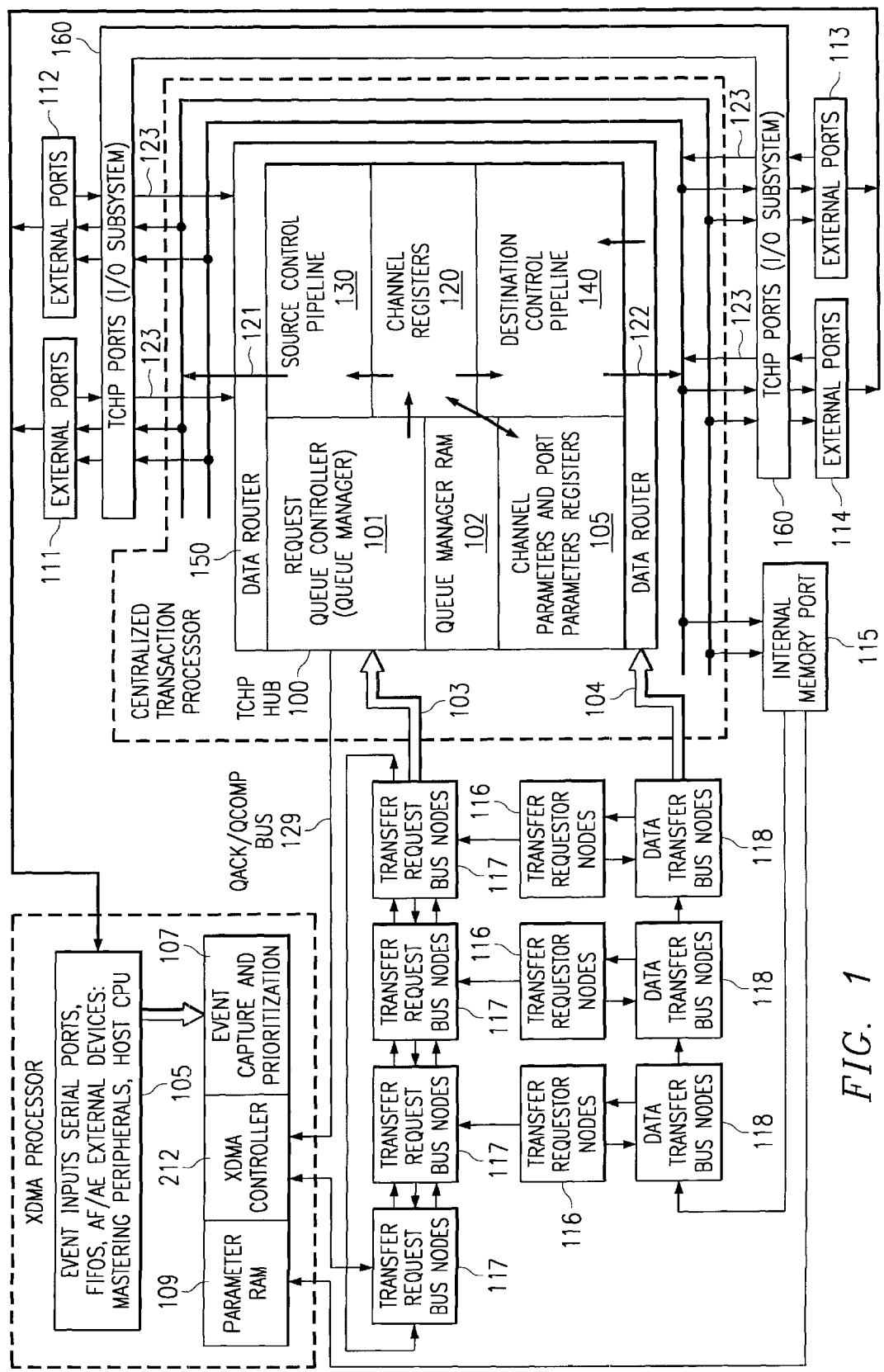
FIG. 1 illustrates the interconnection of the external direct memory access with the centralized transaction processor in accordance with a preferred embodiment of this invention.

Referring to FIG. 1, the external direct memory access processor consists of three main parts. The first part is the event capture and prioritization logic 107 which serves to handle input requests and channel management. This functional block continuously monitors the incoming requests for N-channels of the external direct memory access. Additionally, it is responsible for responding to these requests by prioritizing them and submitting transfer requests to the second portion of the processor, the external direct memory access controller 212.

The third portion of the external direct memory access processor is the parameter RAM 109. The parameter RAM is generically the storage facility for the external direct memory access parameters. Because many complex tasks are supported, a high density RAM is very important to the external direct memory access architecture.

Figure 2:
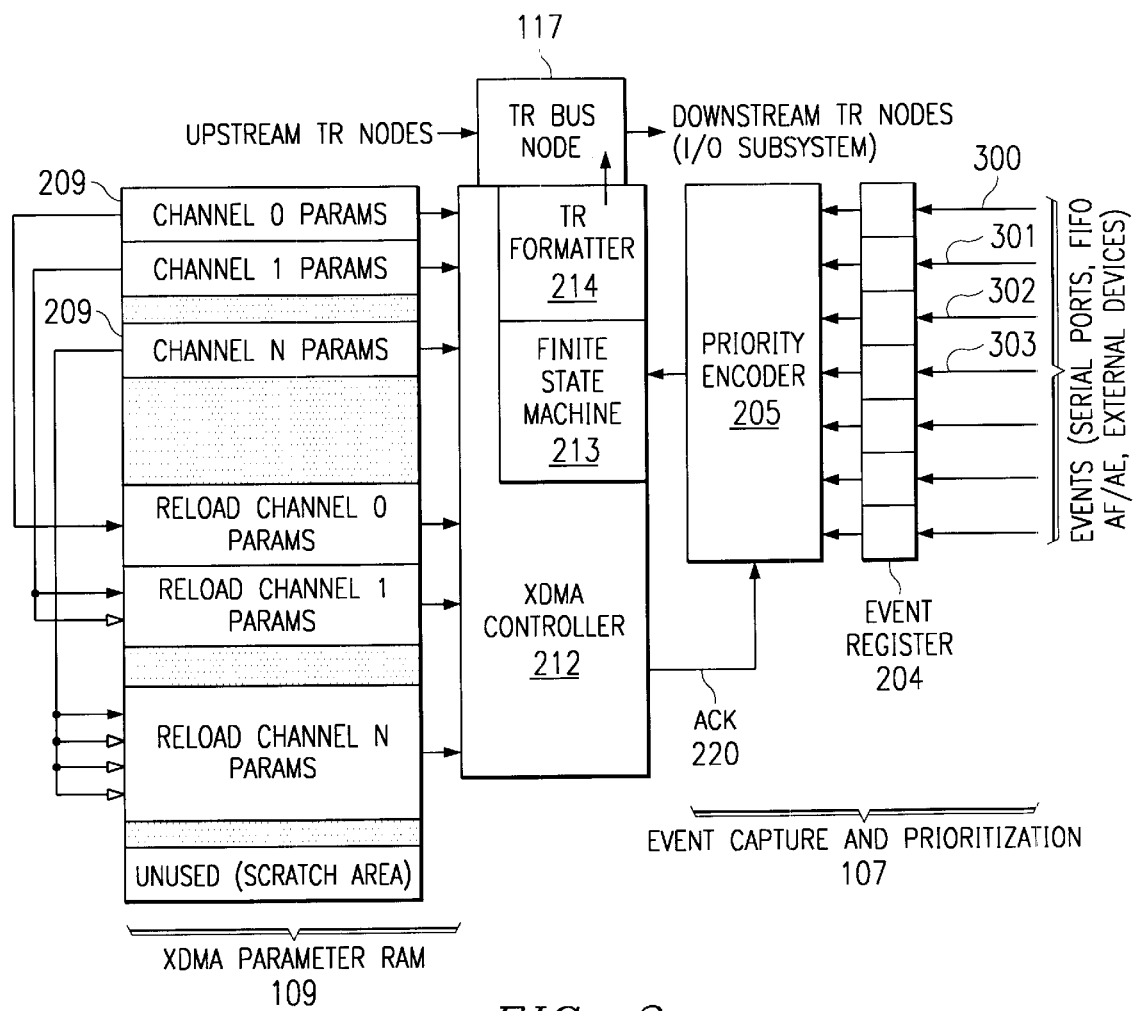
FIG. 2 illustrates the internal external direct memory access architecture.

Another view of the three external direct memory access processor elements illustrated in FIG. 2. Each of the three sections, as will be shown, is highly scalable.

Event capture and prioritization logic 107 contains the event registers 204 and the priority encoder 205.

XDMA controller 212 includes the finite state machine 213 and the transfer request formatter 214.

Parameter RAM 109 which contains the channel parameters 209 and reload versions of the channel parameters 211.

Event Capture and Prioritization

The external direct memory access processor provides DMA service capability for 'N' events. The number of events supported is highly scalable, however, in typical systems will range from 4 to 32. The actual limit is a function of the external direct memory access parameters with respect to the external direct memory access parameter RAM size, the frequency of external direct memory access events on each channel, and the bandwidth required to service these events by the transaction processors.

Events that are signaled to the external direct memory access processor must be captured into a storage device, typically a register. FIG. 2 illustrates these event registers 204. Events are listed as 300 through 303. Sources of events are serial port accesses, FIFO interfaces, and other external device interfaces. Registering of the event is required such that the external direct memory access processor, which may receive simultaneous events from multiple sources, does not lose any event. On each cycle during which the processor is idle, the event register is evaluated to determine if service is being requested by one or more of the channels. The number of events, N, supported by the external direct memory access processor is easily scaled by simply increasing the width of the event register. In the case where more than one channel is requesting service, events must be prioritized.

Prioritization of events in the external direct memory access processor may take many forms. Typically, either a simple priority encoder 205, or random prioritization is used. It is absolutely important to understand however that this prioritization stage is not in any way associated with the priority of the transaction which is being requested in the centralized transaction processor which controls all such processes at the chip level. This external direct memory access processor prioritization occurs only to sort out simultaneous events.

The actual external direct memory access priority of a transfer is determined by parameter bits associated with the transfer, described below. Note that similar to the event registering, it is simple to vary the number of events the external direct memory access processor supports by simply varying the width of the prioritization logic.

Event Servicing in the XDMA Controller

Once an event is selected for service by the prioritization logic, its number is posted to the second section of the external direct memory access processor, the external direct memory access controller 212. The external direct memory access controller is an event servicer, responsible for posting a transfer request packet at the TRBus node 117 to the centralized transaction processor 100, and then clearing the event register for the serviced event thus readying it for the next event. It should be noted that the event might be cleared once the transfer request is made, even though the centralized transaction processor 100 may have not performed the actual service. This allows for pipelining of event signaling with event processing, and thus improves performance over a traditional DMA.

Parameter RAM

Figure 3:
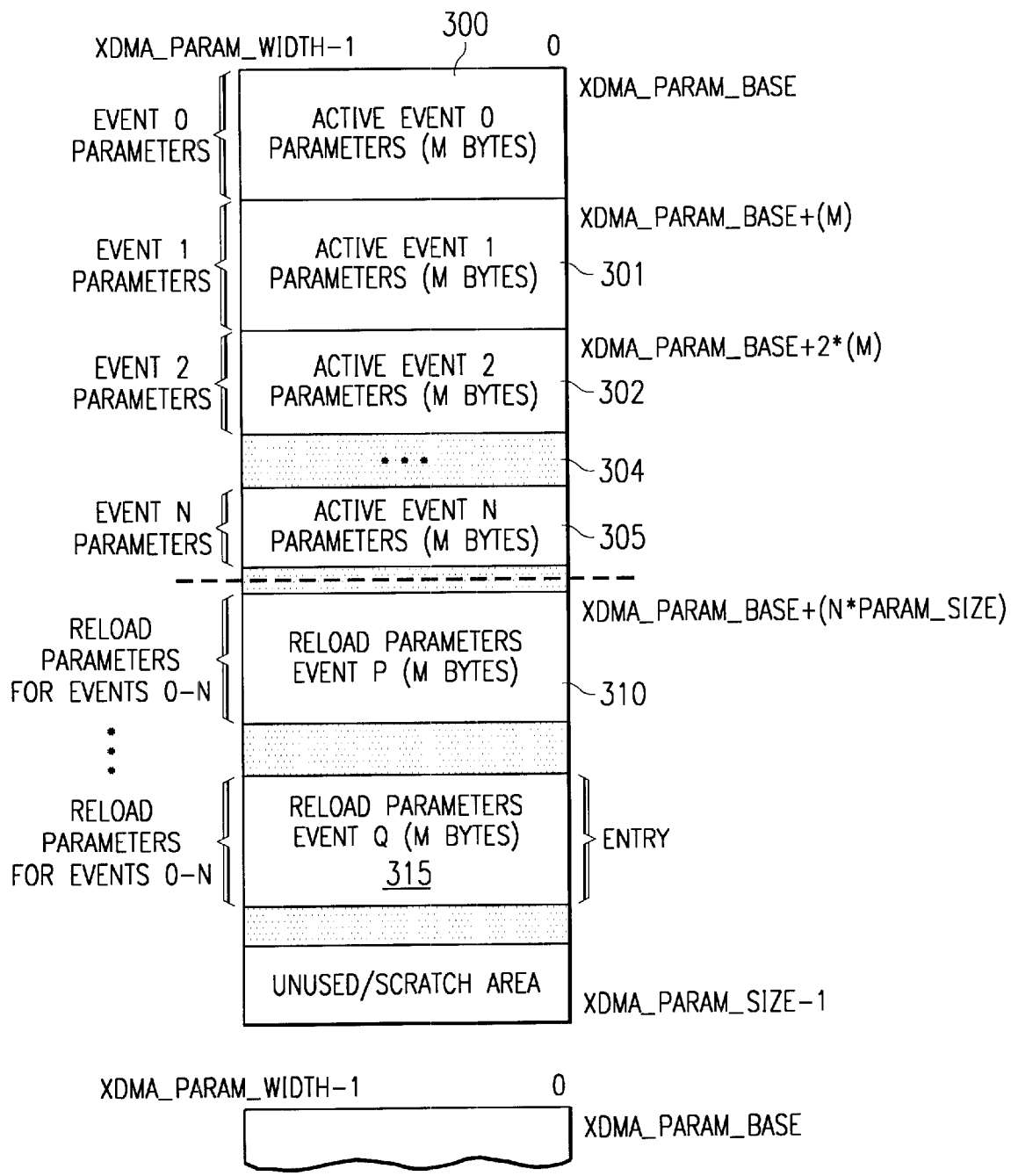
FIG. 3 illustrates the external direct memory access parameters with fixed entry locations.

Referring to FIG. 3, in the external direct memory access architecture, each of the N-events 300 through 305, an event is associated with a set of parameters, which make up the context of the external direct memory access for that event channel. The parameters of each channel may be completely independent of the parameters of all other channels. Channel parameters for each event are stored in the third portion of the external direct memory access processor, the parameter RAM 109. The organization of the parameter RAM is implementation specific, however, will typically include at least the following information:

1) Source address
2) Destination address
3) Element count
4) Transfer options

Depending on the contents and format of the transfer options, the fourth item, additional parameters or altered parameter formats may be present. For example, highly sophisticated external direct memory access implementations may include support for multi-dimensional external direct memory accesses, which would be indicated in the transfer options. Indication of such a transfer might then imply the presence of additional parameters, such as dimensional counts and indexes with which the transfer should be performed. The actual modes and formats of the transfer parameters are not crucial to the description of the present invention.

Figure 4:
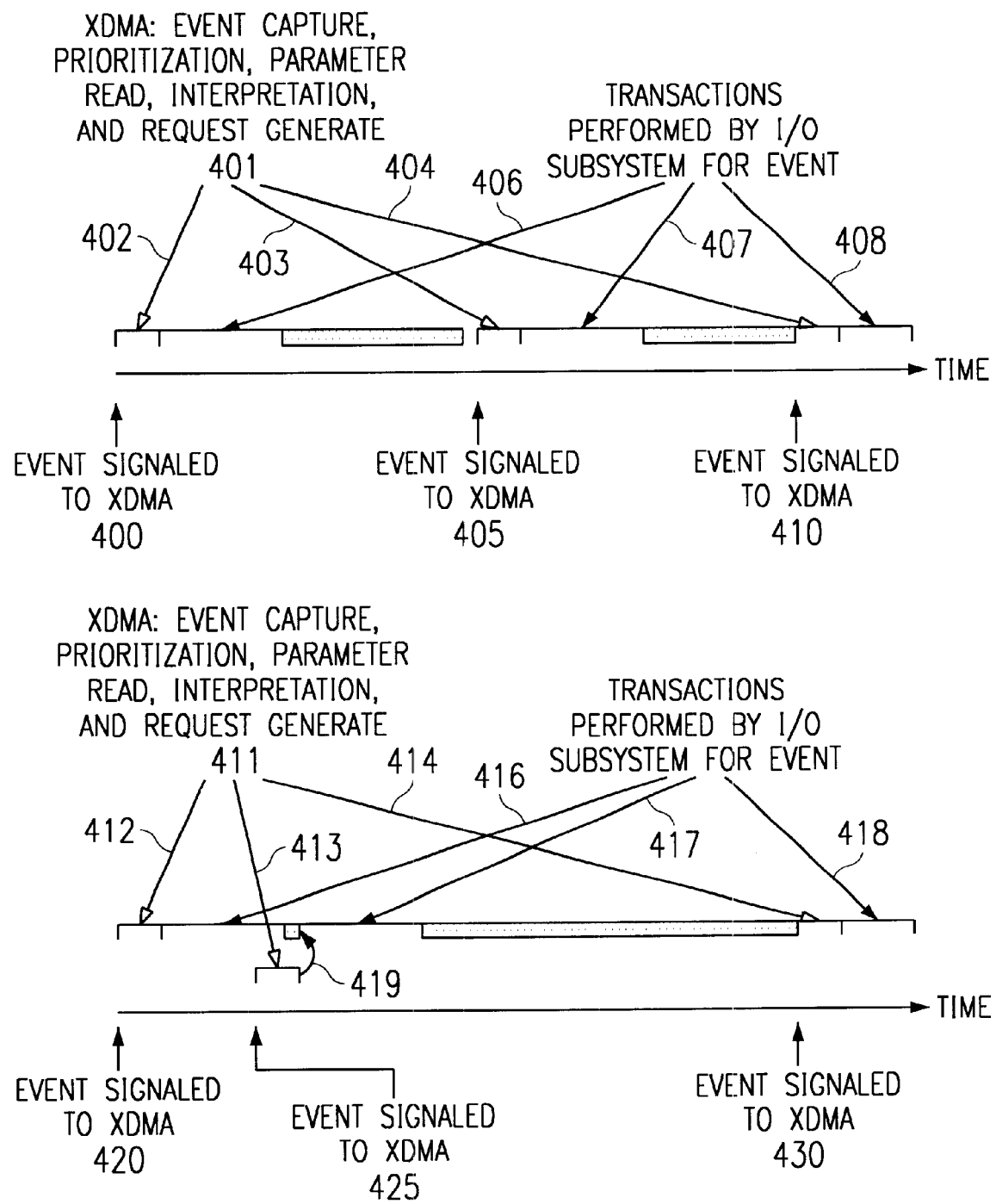
FIG. 4 illustrates the external direct memory access request-I/O subsystem processing interaction.

FIG. 4 illustrates the sequences involved in external direct memory access request processing and its interactions with the I/O subsystem. In sequence 401, once an event is active, that is captured, prioritized, and posted, the event servicer is responsible for reading and interpreting the event parameters, and posting the event to the transaction processor.

In the top portion of FIG. 4, event capture 401 occurs three times 402, 403, and 404, as a result of three events 400, 405, and 410 signaled to the external direct memory access. The corresponding transactions, processes 406, 407, and 408 progress independently, allowing for pipelinihg of the event capture process. The shaded areas of FIG. 4 represent time separation between (a) transaction processing completed and (b) an additional event is signaled to the external direct memory access.

In the bottom portion of FIG. 4, in the time span 419 a second new event 425 is signaled to the external direct memory access before the previous event 420 has been processed. The corresponding transactions, processes 416, 417, and 418, progress independently. Three events 420, 425, and 430 are signaled in the illustration.

All event parameters are stored in system RAM. Typically, a dedicated section of memory, referred to as a parameter RAM, is designated. Functionally, the memory may be any system memory accessible to the external direct memory access event servicer. Typically for simplicity, the memory will be a small memory bank dedicated solely for that use, as opposed to the main system memory.

Each event in the external direct memory access controller is bound to a specific set of transfer parameters. This may be done is one of several ways. Each event may be associated with a specific address in the parameter RAM, at which the transfer parameters for the event always reside. This approach is as illustrated in FIG. 3.

Figure 5:
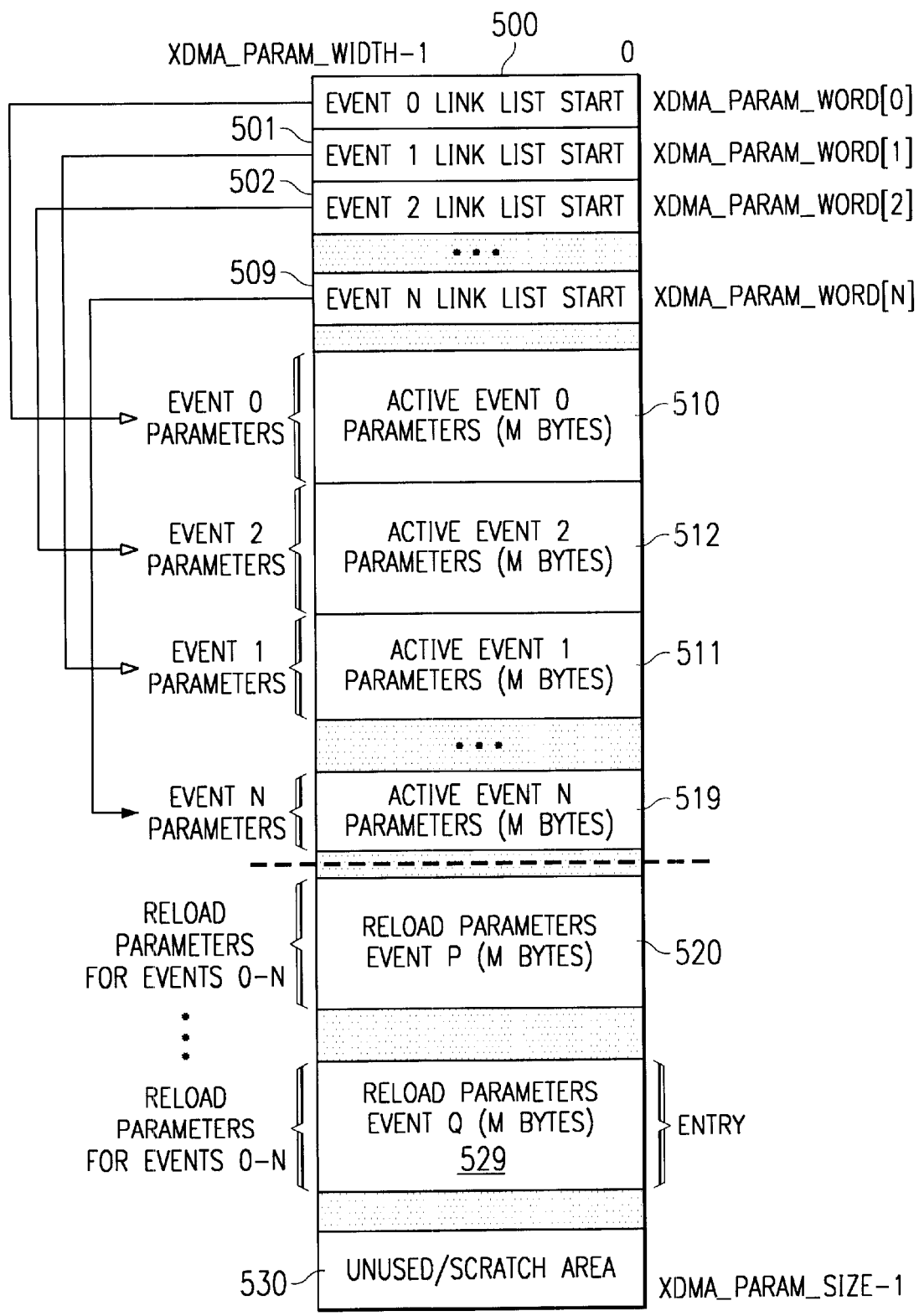
FIG. 5 illustrates the external direct memory access parameters with linked-list option.

Alternately, a linked-list architecture illustrated in FIG. 5 may be used, wherein space dedicated for each channel in the parameter RAM stores the 'address' of the parameters for the event. The links 500 through 509 point to corresponding addresses 510 through 519, not necessarily in the same address order as the links. The link list option of FIG. 5 also shows the reload locations 520 through 529 as in the fixed entry version. In either implementation, the task of the event servicer is basically the same.

The event servicer must read the event parameters, possibly by indirect reference in the linked-list architecture of FIG. 5, and post the request to the transaction processor. Depending on the event parameters, some house-cleaning chores such as parameter updates and writebacks may also be performed. These are a function of the modes, which the external direct memory access controller supports, and are not crucial to the description of present invention.

The external direct memory access controller event servicer, it should be noted, processes one event at a time. That is, once an event is posted from the prioritization block, event servicer processes it and no other events are serviced until the first event servicing is complete. However, the prioritizer may request other service once the event servicer acknowledges the first event service is complete.

Consequently, the external direct memory access controller event servicer is completely independent of the number of channels, which the external direct memory access supports. This is yet another improvement over a traditional DMA controller, wherein event servicing is tightly coupled to the number of DMA channels supported.

Whether by indirect access using a linked-list architecture (FIG. 5), or via direct read of the parameter RAM (FIG. 3), the event servicing state machine will access the parameters for the associated event. The parameters are physically stored in the external direct memory access parameter RAM. Parameters are typically stored in a format similar to the request packet format, which the external direct memory access controller submits to the centralized transaction processor of FIG. 1, or another type of transaction processor. This however is not an absolute requirement.

An additional feature of the stored parameters is that they are typically organized in a user-friendly manner. That is, since the system CPU is responsible for setting up the external direct memory access parameters, parameters are normally structured with separate fields for the above parameters listed. For example, if the system supports 32-bit addressing, the source and destination addresses will normally be stored as two separate parameter words for convenience.

To service the event, the external direct memory access controller event servicer performs one or more reads of the parameter RAM at the appropriate address. The number of reads, and thus number of machine cycles, performed is a function of the external direct memory access RAM implementation and modes supported by the external direct memory access. For example, if 64-bits of information is required to describe a transfer and the RAM is implemented at a 16-bit width, 4 reads may need to be performed.

Similarly, if more complex transfer types are used, they are signaled in the options parameter for the transfer, which will require more or fewer bits to process, varying number of reads may be required. Because this information is stored in the parameters however rather than being associated with the external direct memory access controller itself, the external direct memory access direct memory access is highly flexible, yet another improvement.

The parameters read by the external direct memory access controller event servicer are used to define the transfer to be performed. In general, many of the parameter bits may be passed on to the transaction processor directly. However, because the external direct memory access controller physically reads the parameters from the RAM, it has the option of supporting the interpretation of said parameters for supporting more exotic transfer modes.

For example, if the external direct memory access implementation supports single and multi-element transfer (one word per event vs. multiple words per event), the controller might submit different requests. That is, in a single element transfer type determined by the options parameter(s), the actual request submitted to the transaction processor will be for a single word, while the stored word count might be somewhat greater. In a multi-word transfer, indicated by the options parameter(s), the word count would be sent directly from the stored parameters.

Address and Parameter Updates

An important feature of the external direct memory access controller event servicer, beyond interpretation of the event parameters, is the ability to write back to the parameter RAM. This feature is illustrated in the direct address architecture option (FIG. 3, reload parameter locations 310/315) as well as in the link-list option (FIG. 5, reload parameter locations 520/529) in the external direct memory access parameter RAM. This feature is significant, as it enables many types of accesses to occur without CPU intervention, as is required in real-time data processing.

Figure 6:
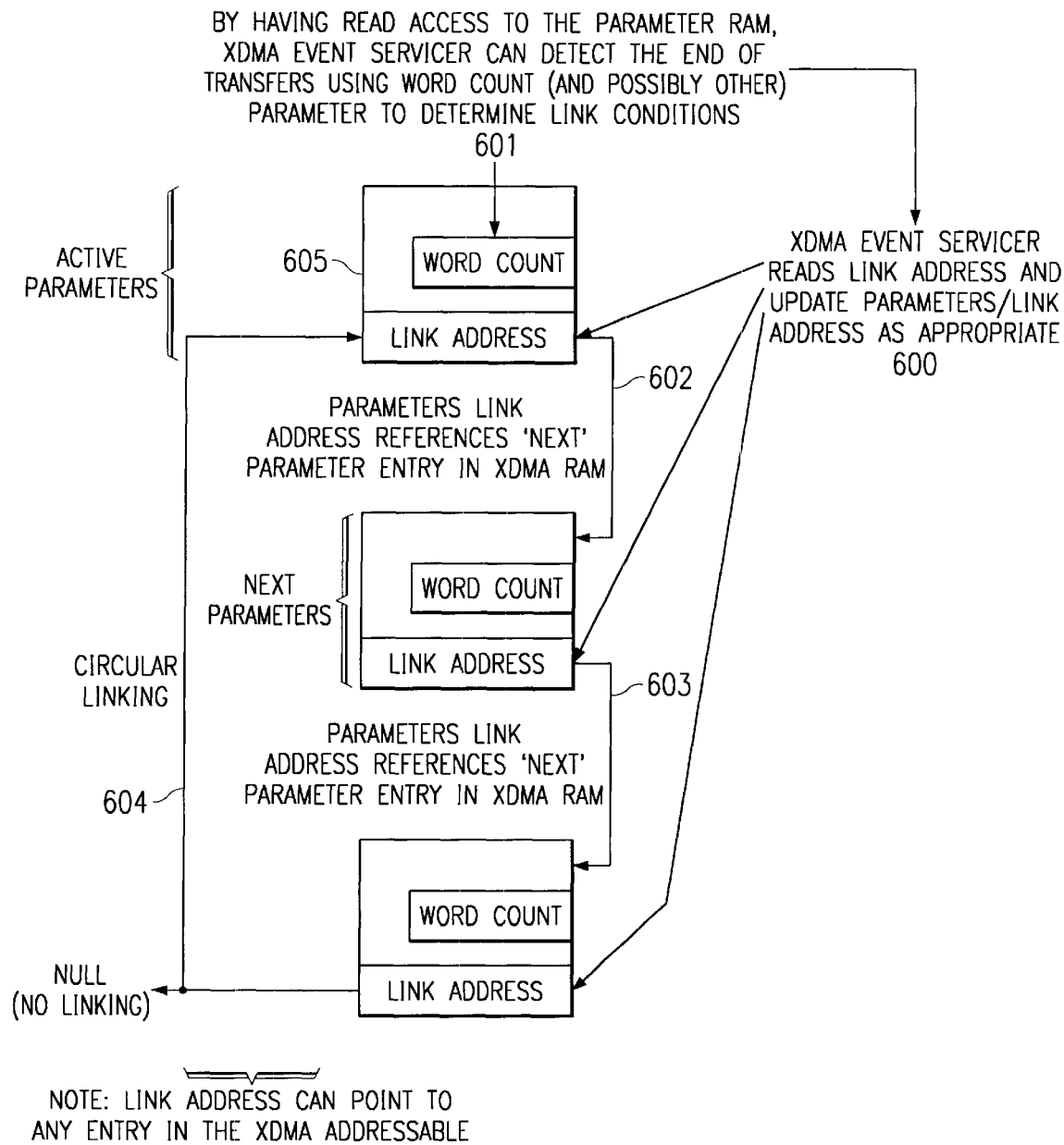
FIG. 6 illustrates the external direct memory access link address function.

This is illustrated in FIG. 6 which shows the external direct memory access controller event servicer monitoring the word count during a transfer 600, and detecting the end of the transfer 601. The occurrence of an end-of-transfer is used to trigger the next linking operation 602. These linking operations then form a loop 603, 604, and 605 back to the initial location when the link list accesses are completed down to the end location. This feature is labeled as 'circular linking' in the figure.

Video FIFO Example

For example, in a video capture system with a line FIFO servicing a front-end device, each line captured in the FIFO must be emptied out to memory. In order to offload the CPU, the external direct memory access must be capable of performing the required operations autonomously.

While the source address is fixed by the FIFO, the destination address must be updated as the events come in such that each line is stored successively to memory, thus building up a frame. To accomplish this, the external direct memory access controller must have the ability to update the event parameters, and write them back to the parameter RAM, thus setting them up for the next event.

Figure 7:
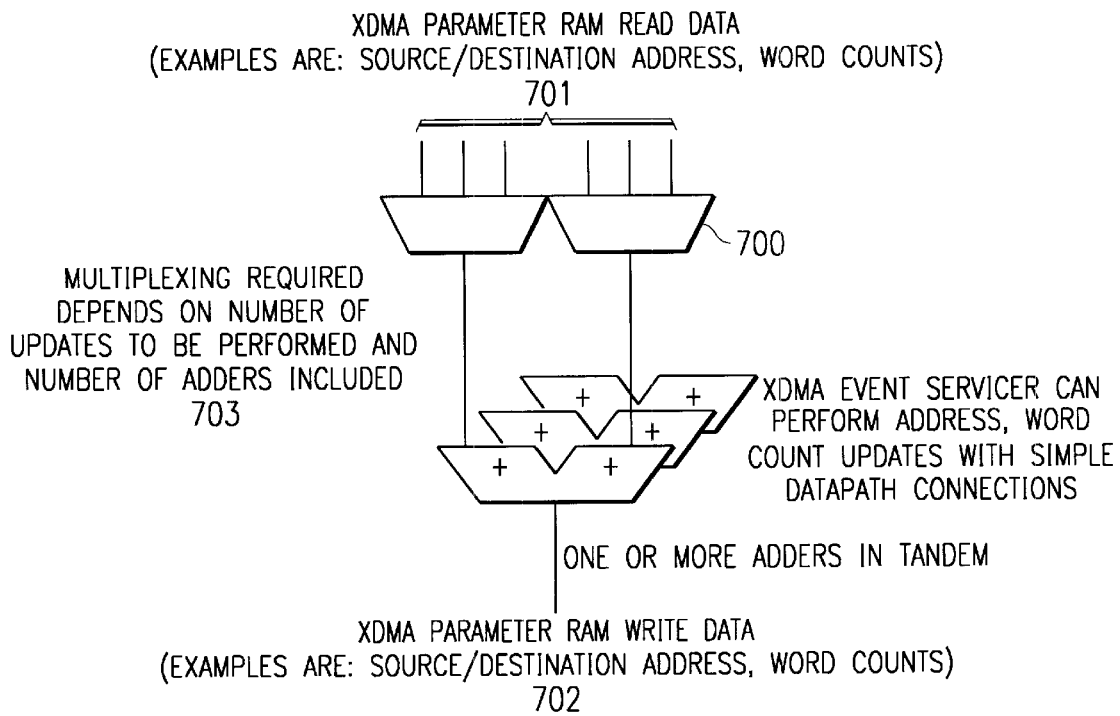
FIG. 7 illustrates the external direct memory access parameter update datapath.

The required hardware for supporting such writebacks illustrated in FIG. 7 varies with the implementation, but will typically include at least one or more adders 700 and a number of multiplexers 703 such that source, destination, and word counts my be updated. The external direct memory access parameter RAM read data which supplies source/destination address and word counts 701 is the input information. The output, external direct memory access parameter RAM write data 702, is computed by applying appropriate multiplexer control signals. Depending on the transfer modes and performance requirements the number of adders will vary.

Beyond parameter updates, the ability to write back to the parameter RAM from the controller enables another key feature of the external direct memory access controller linking. This is an extension of the same type of function already described in FIG. 6. Because the external direct memory access event servicer reads and possibly interprets the event parameters, it has the ability to detect when the parameters of a channel have been exhausted. For example, if a channel is initially set up to transfer one element per request, and the external direct memory access controller updates the count (by decrementing it by one element) each event, eventually the count will reach 0, at which point the transfer is complete.

At this point several options exist. First, the external direct memory access controller architecture provides for the generation of an interrupt to the CPU, informing it that data is ready/required for the channel. Additionally however, the provision is included for supporting a reload of parameters for the channel, from within the external direct memory access itself, requiring no CPU intervention.

To support this, the channel options parameters must include one or more bits denoting that linking is to occur. If indicated, then a link address function must be built into the parameters for the channel such that the external direct memory access event servicer can read the parameters and write them to the appropriate location in the RAM, readying them for the next event.

Note that in the linked-list architecture, only the link address would need to be written rather than a whole parameter set. As might be expected, in the non-linked list architecture, the link field is generally included in all transfer parameter sets, and simply ignored if the options bit(s) are not set indicating linking. The advantages to this method are that all event parameters are the same length, and thus linking will not risk overwriting another event parameters. This method has a slight disadvantage in that some parameter RAM may be wasted on events which do not support linking.

A simple example of linking can be drawn from the above. mentioned video FIFO example. At the end of a frame, in addition to possibly interrupting the CPU, by informing it the frame has been captured, the external direct memory access controller can perform a link operation, if indicated by the parameter options. The parameters to which the link points may look very similar to the original parameters, since the line count and byte count for the next frame will be identical. One difference however might be the destination address, which might point to a different block in memory. Thus, the link process sets up the external direct memory access parameters for the next event, which will be the first line captured in the next frame. When the event occurs, the external direct memory access request is posted to the transaction processor at the new address, and thus a reciprocating buffer has been set up. By linking multiple transfers together, numerous multiple buffer schemes (double, triple, quadruple . . . ) may be easily implemented. Because the parameters are stored in RAM rather than registers (as in traditional DMAs), the ability to store a vastly greater number of such parameters exists.

Event Chaining

A final key feature of the external direct memory access is event chaining. Chaining is a method by which the completion of one event triggers another event. Note again that the external direct memory access controller itself is not actually performing any of the accesses of the transfer. It is only responsible for posting the request to the transaction processor EDMA.

Thus, in order to determine when a transfer is complete, a feedback mechanism is required from the centralized transaction processor. Several implementations are possible, all relying on a critical function of the external direct memory access controller. When a request is posted to the centralized transaction processor, the external direct memory access controller must inform the centralized transaction processor to which event it would like to chain, if this is indeed required as indicated by the parameter options when read by the external direct memory access event servicer.

It is generally preferable to have the chain event be part of the external direct memory access parameters directly, as this allows the CPU maximum flexibility in event chaining. Alternatively, the chain event might be fixed for each channel. Regardless of the implementation, the event servicer is simply responsible for providing the information.

Once the request is made, the event servicer will go back to an idle state, and wait for another event from the prioritization logic to be posted. Note that this is absolutely decoupled from the chain event, namely, the next event to be processed might be from a chain event, or possibly another actual event line. The event servicer is in no way tied to the support for chaining or not and, in fact, does not have knowledge about chaining once the request is made. Consequently, the event servicer is highly scaleable and simple to maintain.

The second part of supporting chaining happens at the event capture end. While the most common method of event signaling is via device pin or peripheral signal, the external direct memory access controller is absolutely independent of the actual source. For example, some systems are designed to provide the CPU the ability to submit DMAs, and thus one or more of the event lines might be tied to the output of a CPU memory mapped register. Additionally, chaining can be supported in this manner.

The centralized transaction processor is responsible for performing the actual reads and writes associated with a transfer, and it is the centralized transaction processor module, which knows when a transfer is actually complete. If chaining is supported by the system, the centralized transaction processor must output appropriate information about the transfer once the final write has completed. This information is typically just the echo-back of the chain event, which was sent with the original request described above.

Figure 8:
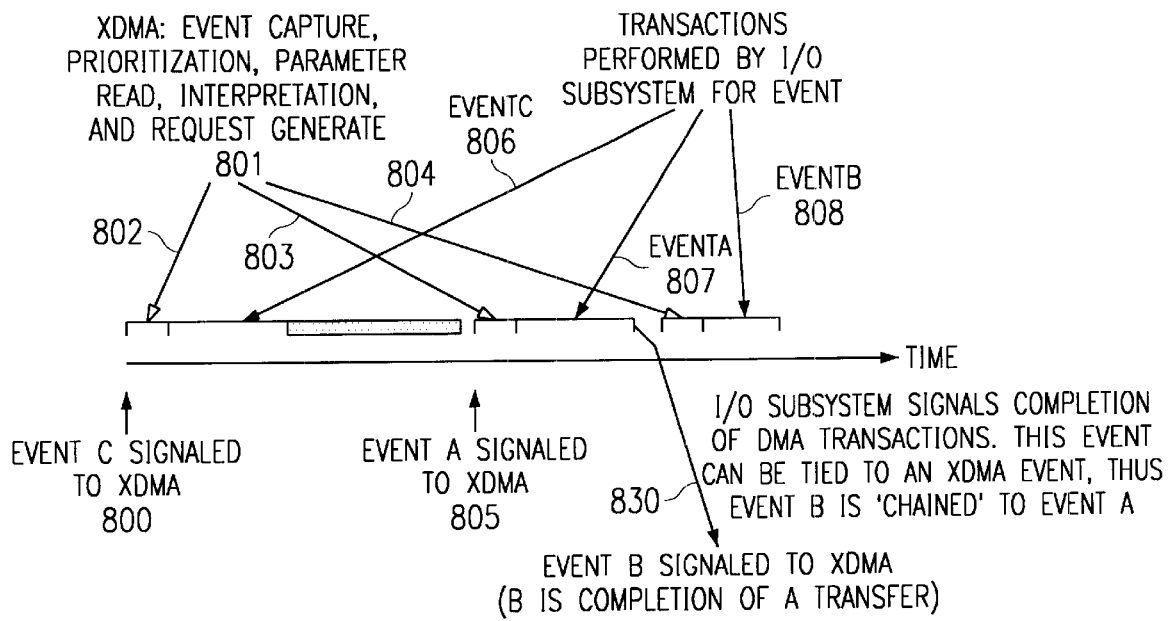
FIG. 8 illustrates the external direct memory access event chaining.

FIG. 8 illustrates event chaining. Three events are signaled to the external direct memory access, the first of which is event C 800. The external direct memory access processes this event 806. Event A 805 is signaled next and external direct memory access processing proceeds 807. During time 806 the I/O subsystem signals the completion of external direct memory access transactions for event A, and this very event (completion of transactions for event A) is tied to the occurrence of a new external direct memory access event, namely, event B that is captured by the external direct memory access 804. In summary the completion of a transfer (event A in the present example) may be used to signal the external direct memory access that a new event (event B in the present example) is to be issued.

Hardware can be added to monitor the centralized transaction processor outputs, and signal an event to the external direct memory access controller upon detection of event completion. In this manner, completion of one event forces signaling of a second event, and thus chaining has occurred. Chaining, in combination with linking, provide two powerful mechanisms for real-time data processing.

XDMA Parameter RAM

The parameter RAM is a generic storage facility for the external direct memory access parameters. While the use of registers is not precluded, in general, as the name implies, the preferred implementation will rely on a RAM device. Random access memory is preferable due to its high density with respect to registers. Because of the ability to support linking and chaining of numerous events, the high density is very important to the external direct memory access architecture.

The size and configuration on the external direct memory access parameter RAM vary with implementation, parameter formats, operation modes, and performance requirements. The size of the RAM is highly dependent on the application. However RAM is highly scalable. The banking and width of the external direct memory access RAM is also variable. As a good general rule however, the external direct memory access RAM width and banking should allow for transfer processing in less than one-half the period of the fastest event. This includes one or more parameter reads, and possibly one or more writebacks/updates/link writes. This provides some overhead for the cases where event prioritization spills over into additional cycles, if that is required.

Typical DMAs will involve many words, perhaps hundreds of thousands, so the above requirement is fairly easy to meet. In general DMA processing by the external direct memory access controller, will require less than 5–10 machine cycles with reasonable banking and parameter organization.

The external direct memory access parameter RAM must be accessible via the CPU both for initialization and for servicing the external direct memory access event servicer for parameter updates and linking. It should be noted however that the CPU will interact with the external direct memory access parameters generally only for initialization and very rarely for servicing, due to the autonomous nature of the external direct memory access controller. Consequently, a very high speed path from the CPU path to the external direct memory access parameters is generally not required.

Additionally, while two paths exist to the RAM, it is generally not required to have a dual port RAM. Rather, the external direct memory access controller is normally given priority, as it requires use of the RAM in real time when an event occurs. Central processing unit accesses, which are rare during normal operation, are held off until the external direct memory access controller is idle.

Summarizing, the external direct memory access processor represents a unique and innovative approach to managing real time data traffic in a DSP system. Its simplistic architecture and high scalability make it ideally suited for a variety of DSP applications. Its separation from centralized transaction processing makes the external direct memory access controller significantly simpler to design, verify, and maintain than conventional DMA devices. The RAM based parameter storage provides for significantly more channels to be managed by a simple controller than in conventional DMA designs. Features such as chaining, linking, and general parameter updates allow for complex real-time data stream processing to occur autonomously, without CPU intervention.

What is claimed is:

1. An external direct memory access unit comprising:
   an event recognizer adapted to recognize one external event of a plurality of event types;
   a priority encoder connected to said event recognizer selecting for service one recognized external event based upon priority assigned to each event type;
   a parameter memory storing service request parameters corresponding to each event type at corresponding addresses each of said service request parameters stored in said parameter memory including a priority for centralized transaction processor independent of said priority of said event recognizer for said corresponding event type; and
   an external direct memory access controller connected to said priority encoder and said parameter memory recalling service request parameters from said predetermined address in said parameter memory corresponding to said recognized event and submitting said recalled service request parameters to a centralized transaction processor.

2. The external direct memory access unit of claim 1, further comprising:
   a central processing unit connected to said parameter memory capable of writing service request parameter to said parameter memory.

3. The external direct memory access unit of claim 1, further comprising:
   a central processing unit connected to said parameter memory capable of writing service request parameter to said parameter memory; and
   wherein said external direct memory access controller is further connected to said central processing unit and transmits a interrupt to said central processing unit upon submitting said recalled service request parameters to said centralized transaction processor of a last of said linked list to said centralized transaction processor.

4. An external direct memory access unit comprising:
   an event recognizer adapted to recognize one external event of a plurality of event types;
   a priority encoder connected to said event recognizer selecting for service one recognized external event based upon priority assigned to each event type;
   a parameter memory storing service request parameters corresponding to each event type at corresponding addresses, at least one of said service request parameters stored in said parameter memory including an address pointer to a linked list of additional service request parameters; and
   an external direct memory access controller connected to said priority encoder and said parameter memory recalling service request parameters from said predetermined address in said parameter memory corresponding to said recognized event and submitting said recalled service request parameters to a centralized transaction processor.

5. The external direct memory access unit of claim 4, wherein:
   each of said service request parameters stored in said parameter memory includes at predetermined location an indication whether additional service request parameters are located in a linked list.

6. The external direct memory access unit of claim 4, further comprising:
   a central processing unit connected to said parameter memory capable of writing service request parameter to said parameter memory; and
   wherein said external direct memory access controller is further connected to said central processing unit and transmits a interrupt to said central processing unit upon submitting said recalled service request parameters to said centralized transaction processor of a last of said linked list to said centralized transaction processor.

7. The external direct memory access unit of claim 4, further comprising:
   a central processing unit connected to said parameter memory capable of writing service request parameter to said parameter memory.

8. An external direct memory access unit comprising:
   an event recognizer adapted to recognize one external event of a plurality of event types;
   a priority encoder connected to said event recognizer selecting for service one recognized external event based upon priority assigned to each event type;
   a parameter memory storing service request parameters corresponding to each event type at corresponding addresses, said service request parameters stored in said parameter memory each consist of direct memory access parameters specifying a data transfer between memories;
   an external direct memory access controller connected to said priority encoder and said parameter memory recalling service request parameters from said predetermined address in said parameter memory corresponding to said recognized event and submitting said recalled service request parameters to a centralized transaction processor; and
   said centralized transaction processor is a direct memory access unit controlling data transfers between memories in accordance with received direct memory access parameters.

9. The external direct memory access unit of claim 8, further comprising:
   a central processing unit connected to said parameter memory capable of writing service request parameter to said parameter memory; and
   wherein said external direct memory access controller is further connected to said central processing unit and transmits a interrupt to said central processing unit upon submitting said recalled service request parameters to said centralized transaction processor of a last of said linked list to said centralized transaction processor.

10. The external direct memory access unit of claim 8, further comprising:

a central processing unit connected to said parameter memory capable of writing service request parameter to said parameter memory.

11. An external direct memory access unit comprising:

an event recognizer adapted to recognize one external event of a plurality of event types;

a priority encoder connected to said event recognizer selecting for service one recognized external event based upon priority assigned to each event type;

a parameter memory storing service request parameters corresponding to each event type at corresponding addresses, said direct memory access parameters stored in said parameter memory may specify data transfer of direct memory access parameters to said parameter memory; and an external direct memory access controller connected to said priority encoder and said parameter memory recalling service request parameters from said predetermined address in said parameter memory corresponding to said recognized event and submitting said recalled service request parameters to a centralized transaction processor.

12. The external direct memory access unit of claim 11, further comprising:

a central processing unit connected to said parameter memory capable of writing service request parameter to said parameter memory; and wherein said external direct memory access controller is further connected to said central processing unit and transmits a interrupt to said central processing unit upon submitting said recalled service request parameters to said centralized transaction processor of a last of said linked list to said centralized transaction processor.

13. The external direct memory access unit of claim 11, further comprising:

a central processing unit connected to said parameter memory capable of writing service request parameter to said parameter memory.

14. An external direct memory access unit comprising:

an event recognizer adapted to recognize one external event of a plurality of event types;

a priority encoder connected to said event recognizer selecting for service one recognized external event based upon priority assigned to each event type;

a parameter memory storing service request parameters corresponding to each event type at corresponding addresses; and an external direct memory access controller connected to said priority encoder and said parameter memory recalling service request parameters from said predetermined address in said parameter memory corresponding to said recognized event and submitting said recalled service request parameters to a centralized transaction processor, said centralized transaction processor being further connected to said event recognizer, said centralized transaction processor signaling an external event to said event recognizer upon completion of at least one service request.

15. The external direct memory access unit of claim 14, further comprising:

a central processing unit connected to said parameter memory capable of writing service request parameter to said parameter memory; and wherein said external direct memory access controller is further connected to said central processing unit and transmits a interrupt to said central processing unit upon submitting said recalled service request parameters to said centralized transaction processor of a last of said linked list to said centralized transaction processor.

16. The external direct memory access unit of claim 14, further comprising:

a central processing unit connected to said parameter memory capable of writing service request parameter to said parameter memory.

* * * * *